United States Patent
Hemsley et al.

[15] 3,666,885
[45] May 30, 1972

[54] MEASURING APPARATUS AND METHODS UTILIZING A SINGLE LINE SCAN TELEVISION CAMERA

[72] Inventors: Brian Hemsley, 71, Crimicar Drive, Fulwood Sheffield, Yorkshire; Lionel Frederick Hinbest, 53, Grenfolds Road, Grenoside, near Sheffield, Yorkshire; Joseph Willaim Marshall, 55, Wollaton Avenue, Bradway, Sheffield, Yorkshire, all of England

[22] Filed: Jan. 3, 1969

[21] Appl. No.: 826,734

[30] Foreign Application Priority Data

Jan. 4, 1968  Great Britain ..................... 700/68

[52] U.S. Cl. ............ 178/6.8, 178/DIG. 1, 178/DIG. 2, 250/219 WD, 250/219 TH, 356/23
[51] Int. Cl. .................................. H04n 7/02, H04n 7/18
[58] Field of Search ............ 178/6, 6.8, DIG. 2; 356/23, 356/156; 250/219 LG, 219 WD, 219 TH

[56] References Cited

UNITED STATES PATENTS

| | | | |
|---|---|---|---|
| 3,101,415 | 8/1963 | Libenschek | 178/6 |
| 3,321,575 | 5/1967 | Lewczyk | 178/6 |
| 3,419,677 | 12/1968 | Fiori | 178/6.8 |
| 2,798,605 | 7/1957 | Richards | 178/6 IND |
| 3,218,389 | 11/1965 | Reed | 356/156 |
| 3,275,744 | 9/1966 | Dietrich | 356/23 |
| 3,390,229 | 6/1968 | Williams | 178/6 IND |

OTHER PUBLICATIONS

Sokolski, Fiber Optic Read Head, IBM Tech. Disclosure Bulletin Vol. 8 No. 6 Nov. 1965 pg. 829.

*Primary Examiner*—Robert L. Griffin
*Assistant Examiner*—Joseph A. Orsino, Jr.
*Attorney*—Holcombe, Wetherill & Brisebois

[57] ABSTRACT

Method of detecting a dimension of an elongated vibrating object being rolled, using a television camera, which method comprises periodically directing a light pulse onto an object to form a shadow image thereof in the camera, temporarily stopping the scanning beam of the camera for a period including an interval immediately following each pulse, repeatedly scanning the beam in the direction to be measured to provide video signals from successive lines, selecting a video signal corresponding to one line during each interval when the beam is operative, and deriving from the selected signal another signal having a value representative of the dimension to be measured.

15 Claims, 5 Drawing Figures

Patented May 30, 1972

INVENTORS
B. HEMSLEY
BY L. H INBEST
J. MARSHALL
Holcombe, Wetherill+Brisebois
ATTORNEYS Patented May 30, 1972
3,666,885
3 Sheets-Sheet 2
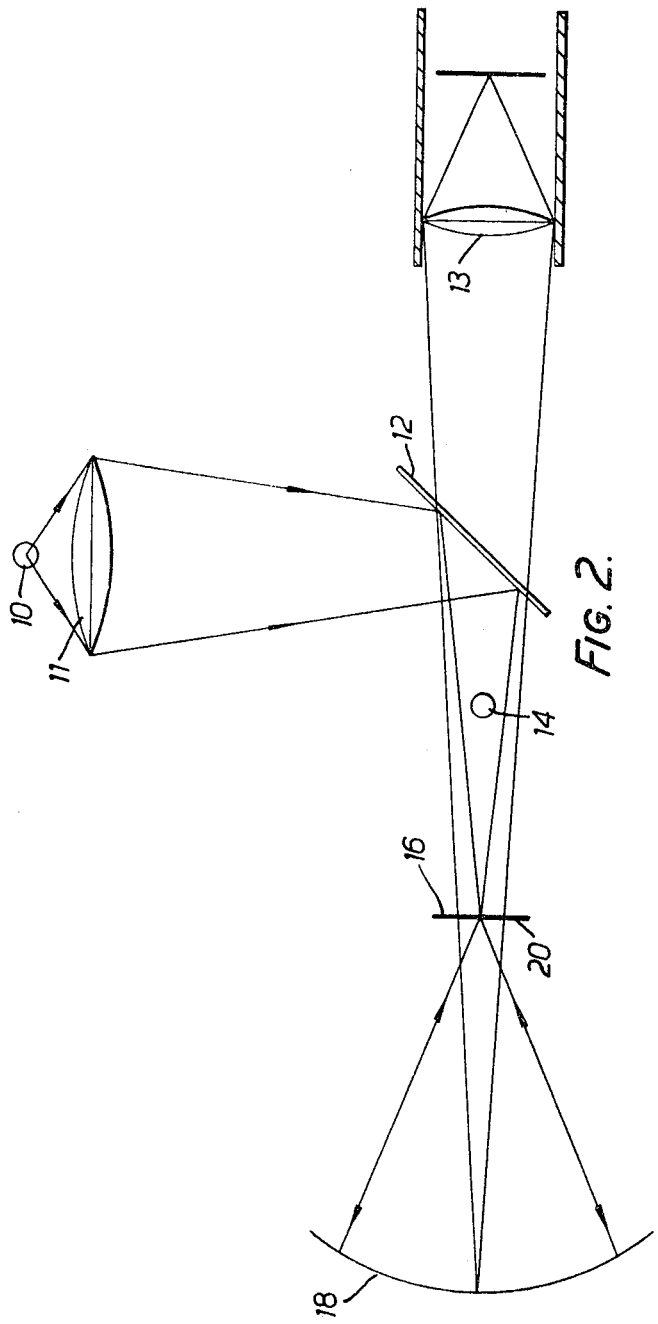
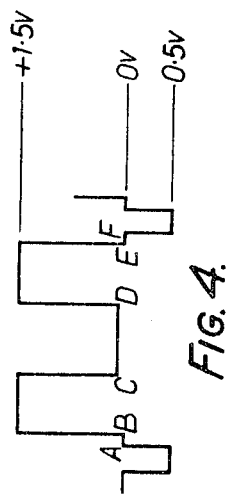
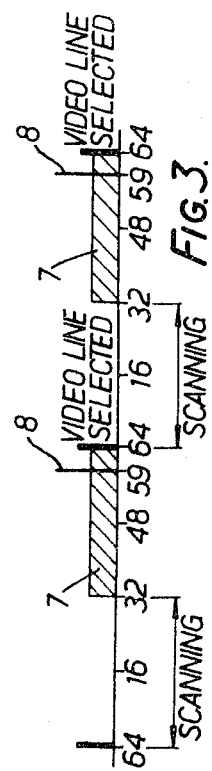
INVENTORS
B. HEMSLEY
BY L. HINBEST
J. MARSHALL
Holcombe, Wetherill & Brisebois
ATTORNEYS

MEASURING APPARATUS AND METHODS UTILIZING A SINGLE LINE SCAN TELEVISION CAMERA

This invention relates to a method and apparatus for accurately detecting or measuring a dimension of an object, and has particular application to the measurement of a dimension of a rapidly moving object, for example the diameter of a vibrating steel rod undergoing rolling, or the diameter of a stream of molten metal.

According to the invention, there is provided apparatus for detecting or measuring a dimension of an object, comprising a television camera modified for single line scanning, means for emitting and directing a short duration light pulse on to the object to form a shadow image of the object in the camera, means for applying a blanking signal to quench the electron beam of the camera for a predetermined number of consecutive lines, means for triggering said emitting means to emit a light pulse during the blanking period, means for removing the blanking signal to permit the image to be repeatedly scanned by the beam in the direction of the dimension to be measured to provide successive video lines, and means for detecting or measuring the duration of the image portion of a selected one of the video lines to enable the dimension of the object to be detected or measured.

According to the invention, there is also provided a method of detecting or measuring a dimension of an object, comprising modifying a television camera for single line scanning, emitting and directing a short duration light pulse onto the object to form a shadow image of the object in the camera, applying a blanking signal to quench the electron beam of the camera for a predetermined number of consecutive lines, triggering the emitting means to emit a light pulse during the blanking period, removing the blanking signal to permit the image to be repeatedly scanned by the beam in the direction of the dimension to be measured to provide successive video lines, and detecting or measuring the duration of the image portion of a selected one of the video lines to enable the dimension of the object to be detected or measured.

Features and advantages of the invention will be apparent from the following description of an embodiment thereof given, by way of an example only in conjunction with the accompanying drawing, in which FIG. 1 shows diagrammatically apparatus according to the invention;

FIG. 2 shows diagrammatically an optical system of the apparatus when the object to be measured is hot;

FIG. 3 shows the operational cycle of the apparatus which is controlled by the logic module, and FIG. 4 shows the video line waveform.

Figure 1:
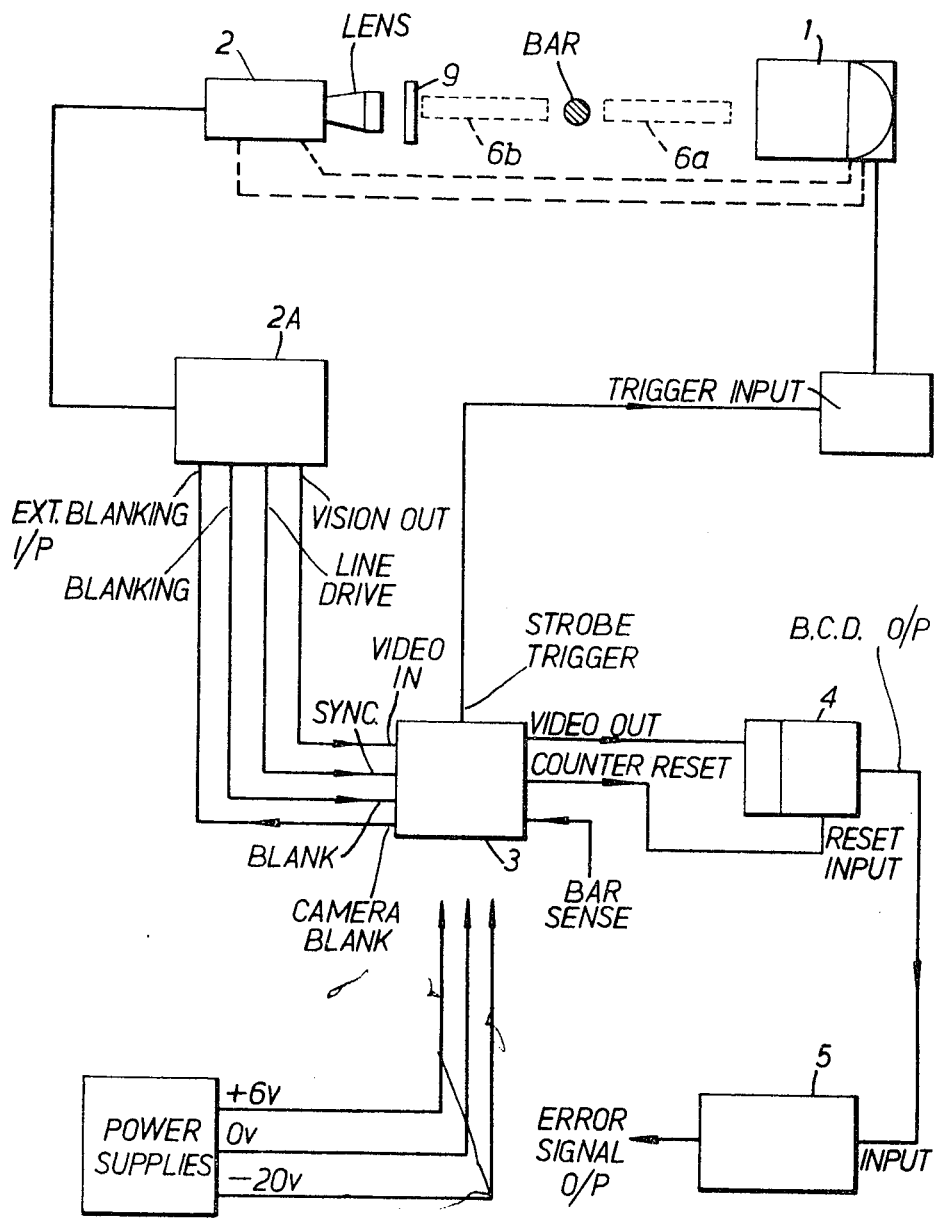

Referring to FIGS. 1 and 3 the apparatus includes a stroboscope 1 for directing a short duration light pulse on to the object and a TV camera 2 having a vidicon type of camera tube and modified for single line scanning; the object to be measured produces a shadow image on the vidicon camera tube, and a typical line waveform is shown in FIG. 4. When the bar is hot a suitable filter 9 must be placed between the bar and the camera tube; the filter cuts out the radiated energy from the bar itself, while transmitting the light from the stroboscope so that a shadow image of the objection is still produced.

In this case where the camera operates on the 625 line system, a point on the single line scan will be re-scanned every 64 $\mu$ sec; other line frequencies may be used. In other words single line scanning means that there is no frame scan operating, and the same fixed line in the camera-tube face is scanned at a frequency determined by the line-scan oscillator.

When a point on the target of a vidicon camera tube is exposed to a short burst (say 1$\mu$ sec duration) of light energy there is a delay, say 5 line times or 320 $\mu$ sec minimum before the charge at that point has leaked away through its lowered resistance to provide a useful stored image. Also it takes a number, up to 20, of scans by the electron beam over a discharged point on the target to recharge it fully to remove the image at this point.

To allow for these target characteristics the apparatus is operated according to the operation cycle (see FIG. 3) performed by a camera control unit 2A and logic module 3.

The complete cycle of operation takes 64 line scan times or 4.096 m.sec. For 32 consecutive line scans a blanking signal 7 is applied to the vidicon cathode to suppress the electron beam. The stroboscope is triggered at instant 8 at a minimum of 5 line scans from the end of the blanking period so that a useful stored image exists; in practice the stroboscope can be triggered at the beginning of the blanking period. The blanking is then removed and the image is repeatedly scanned for the next 32 lines and then the cycle repeats, the image being scanned in the direction of the dimension to be measured. The module includes a "video gate" so that only the first video line after blanking is used for measurement of the object dimension, the remaining 31 are used to remove the stored image from the camera tube.

The scanned image provides the video line waveform (see FIG. 4). This waveform is processed to give a single rectangular pulse (not shown) equal to the time interval between C and D which represents the image portion of the waveform. This interval is measured by feeding the pulse into the counter/timer unit 4 which displays the time in 1/100 $\mu$ sec units and supplies a corresponding Binary Coded Decimal output to the Analogue of Difference Unit 5.

The Analogue of Difference Unit as its name implies provides an analogue signal of the difference between the output from the counter/timer and the preset standard dimension. For example, if the diameter of hot ½ inch bar as it comes from a rolling mill is to be detected, the apparatus would be set up as follows:

First a piece of accurately ground ½ bar diameter bar would be placed at the position to be assumed by the rolled bar. Then into unit 5 would be dialled the number of 1/100 $\mu$ sec units as displayed by unit 4, plus an additional number of units to allow for expansion if the bar to be rolled is hot. This combined setting on unit 5 is then the preset datum for ½ inch diameter bar. When a bar is being rolled the unit subtracts the preset datum from the achieved count of 4. The difference between the two is given as an analogue voltage by 5, that is to say a voltage which varies directly in magnitude and sign with the difference between the two.

This output error voltage can then be displayed on either a pen of UV recorder to give a continuous error measurement of the bar being rolled or alternatively fed to a center zero galvanometer. The error voltage could also be used as a feed back signal for controlling automatically the rolling mill.

To ensure a uniform intensity of light from the arc discharge bulb of the stroboscope, a non coherent fiber optic element 6a may be positioned between the stroboscope bulb and the object; also a coherent fiber optic element 6b may be positioned between the object and the camera lens for transmitting the shadow image to the lens.

If the object is hot, there may be the problem of light refraction at the hot/cold air interfaces which exist in the region of the body and which could affect the shadow image formed in the camera. In this case, we would employ a modified form of Töpler-Schlieren system of image production to obviate from the image forming light any light which has been refracted at hot/cold air boundaries.

Schlieren systems are most commonly used as methods for visualization of flow, such as that which occurs in a wind tunnel, and depends upon the deflection of a ray of light from its undisturbed path when it passes through a medium in which there is a component of the gradient of refractive index of the medium normal to the ray. In the typical Schlieren system, a source of light is focused by a lens so that the working section of a wind tunnel, for example, is illuminated by a parallel beam of light. Another lens system produces an image of the flow in the tunnel at a point on a screen. Any change in the refractive index of the medium normal to the ray will displace the image, allowing the use of varying methods to measure this displacement.

In the Töpler-type Schlieren system, the displacement is converted to a change of illumination of the image on the screen. Using a rectangular monochromatic light source and a knife edge (blade) placed at the focal plane of the second lens, the part of the light from the image of the source is cut off from the camera lens and reduces the illumination on the screen. Optical disturbances produced changes in the illumination. The knife edge is set perpendicular to the direction in which density gradients are observed.

FIG. 2 illustrates a variation on the Töpler-Schlieren system in which a blade 16 is used to remove from the image-forming light any light which has been refracted at hot-cold air boundaries. The present invention is concerned with changes in refractive index, not in wind tunnels, but at hot-cold air boundaries.

Referring to FIG. 2, the pulsed light beam from a strobe lamp 10 without reflector passes through a condenser lens 11 to a front semi-silvered mirror 12 positioned between the T.V. camera lens 13 and the hot object 14. The beam, after reflection from mirror 12, is focussed at the straight edge of a blade 16 positioned at the center of curvature of a part-spherical front silvered mirror 18; an image of the blade 16 is formed at 20 by the mirror 18.

For information regarding the production of an image by the Töpler-Schlieren system, reference is made to the Encyclopaedic Dictionary of Physics, Pergamon Press 1962 pages 410 and 411.

Figure 5:
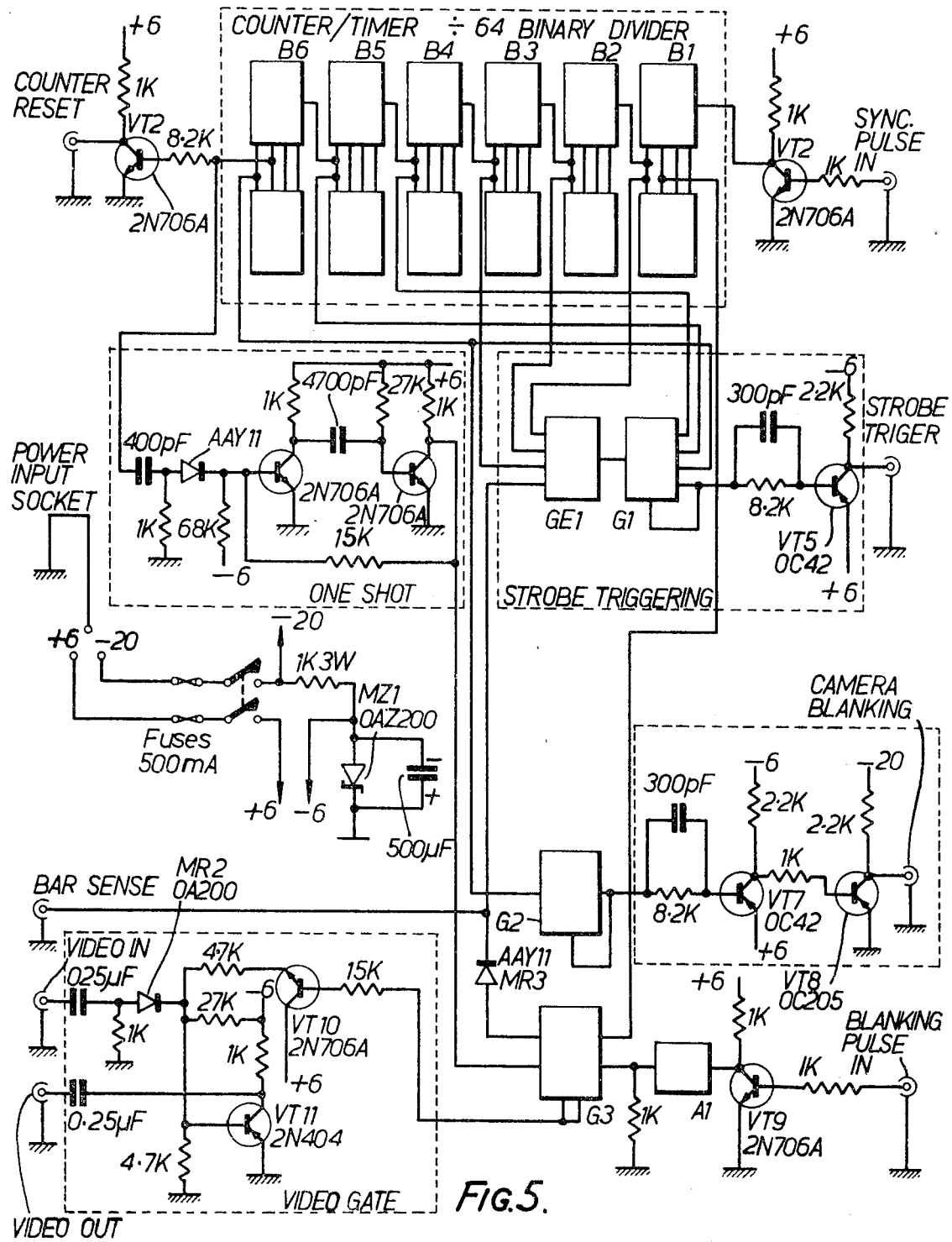
FIG. 5 is a circuit diagram of the logic module.

The electrical circuit diagram of the logic module 3 is shown in FIG. 5.

We claim:

1. A method of detecting a dimension of an elongated vibrating object undergoing rolling, using a television camera arranged to scan the same fixed line in the camera-tube face at a frequency of the order of conventional line scan frequencies determined by the line scan oscillator of said camera, said method comprising the steps of:
    A. emitting a short-duration light pulse at predetermined regular intervals independent of the position of said object and directing it onto said object to form a shadow image of the object in the camera,
    B. stopping the electron beam of the camera for a blanking period including an interval after the emission of the short-duration light pulse, which interval would be sufficient for a predetermined number of consecutive lines,
    C. restarting said electron beam,
    D. repeatedly scanning the electron beam in the direction of the dimension to be measured to provide video signals from successive lines, and
    E. selecting a video signal corresponding to one and only one of said successive lines during each interval when the electron beam is operative, and
    F. deriving from the selected signal another electrical signal having a value representative of the time-duration of the image-carrying interval of the selected video signal.

2. A method according to claim 1, wherein said emitting means is triggered not later than 5 line scans from the end of the blanking period.

3. A method according to claim 1, wherein said emitting means is triggered at the beginning of the blanking period.

4. A method according to claim 1, wherein the camera operates on a 625 line system and wherein the blanking signal is alternately applied for 32 consecutive line scans and is removed for 32 consecutive line scans.

5. A method according to claim 1 wherein said one and only one of said successive lines is the first video line to occur after the said electron beam is restarted.

6. A method according to claim 1, wherein the object is hot, and further comprising the step of using a Töpler-Schlieren type of system as the optical system to produce said shadow image, whereby image inaccuracies due to light refraction are reduced.

7. A method according to claim 1 wherein the object is a moving bar undergoing rolling.

8. A method according to claim 13, wherein the detected dimension is compared with a standard dimension to control the roll gap of the rolling mill.

9. Apparatus for detecting a dimension of an elongated vibrating object comprising:
    A. a television camera means adapted for scanning the same fixed line in the camera-tube face at a frequency of the order of conventional line scan frequencies determined by the line-scan oscillator of said camera,
    B. a stroboscopic light means for emitting and directing a short-duration light pulse onto the object for forming a shadow image of the object in the camera,
    C. means for stopping the electron beam of the camera for a blanking period including an interval after the emission of the short-duration light pulse, which interval would be sufficient for scanning a predetermined number of consecutive lines at said rate,
    D. means for triggering said emitting means at regular predetermined intervals independent of the position of said object,
    E. means for restarting the electron beam to permit the shadow image to be repeatedly scanned by the beam in the direction of the dimensions to be measured to provide video signals from successively scanned lines, and
    F. means responsive to said video signal for selecting one and only one portion of said video signal corresponding to one and only one of said scanned lines and responsive to said portion of said video signal for deriving an electrical signal having a value representative of the time-duration of the image-carrying interval of the selected video signal portion.

10. Apparatus according to claim 9 wherein said one and only one of said scanned lines is the first video line to occur after said blanking signal is removed.

11. Apparatus according to claim 9, wherein the triggering means is set to trigger said stroboscope not later than 5 line scans from the end of the blanking period.

12. Apparatus according to claim 11 and including a non coherent fiber optic element for receiving light from the arc discharge bulb of the stroboscope and for transmitting a light beam of substantially uniform intensity on to the object.

13. Apparatus according to claim 9, wherein the camera has a zoom lens for accommodating different ranges of object dimensions.

14. Apparatus according to claim 9, and including a filter to prevent radiant energy emitted by the object when hot from reaching the camera.

15. Apparatus according to claim 9, and including a coherent fiber optic element for transmitting the shadow image to the camera lens.

* * * * *